United States Patent [19]

Toyoda

[11] Patent Number: 4,504,926
[45] Date of Patent: Mar. 12, 1985

[54] MODE SETTING CONTROL SYSTEM
[75] Inventor: Shinjiro Toyoda, Yokohama, Japan
[73] Assignee: Tokyo Shibaura Denki Kabushiki Kaisha, Kawasaki, Japan
[21] Appl. No.: 365,894
[22] Filed: Apr. 6, 1982
[30] Foreign Application Priority Data Apr. 21, 1981 [JP] Japan ................. 56-60129

[51] Int. Cl.³ .............................................. G06F 3/00
[52] U.S. Cl. .................................................. 364/900
[58] Field of Search ... 364/200 MS File, 900 MS File

[56] References Cited
U.S. PATENT DOCUMENTS 4,349,870 9/1982 Shaw et al. ............... 364/200

OTHER PUBLICATIONS

MC6801 8-Bit Single-Chip Microcomputer Reference Manual, Motorola, 1980, pp. 1-1-3-27.
Motorola Semiconductors Advance Information ADI-803R2, p. 12, (publication date unknown, but it bears a © notice of 1980).
Intel MCS-48 Microcomputer User's Manual, pp. 2-15, (Nov. 1976).

Primary Examiner—Gareth D. Shaw
Assistant Examiner—Ronni S. Malamud
Attorney, Agent, or Firm—Finnegan, Henderson, Farabow, Garrett & Dunner

[57] ABSTRACT

A mode setting control system comprising a one-chip microprocessor and a mode setting circuit provided outside the microprocessor. The mode setting circuit comprises mode designating switches, diodes and a flip-flop. Data representing the mode designated by the switches is written into the one-chip microprocessor through I/O pins. After the one-chip microprocessor has been brought out of the reset state, an ADR signal is supplied from the one-chip microprocessor through an ADR pin thereof, whichever operation mode the microprocessor is set to. The ADR signal is supplied to the mode setting circuit, thus electrically disconnecting the same from the one-chip microprocessor. Consequently, data other than the mode data can be written into the I/O pins.

13 Claims, 3 Drawing Figures

F I G. 1
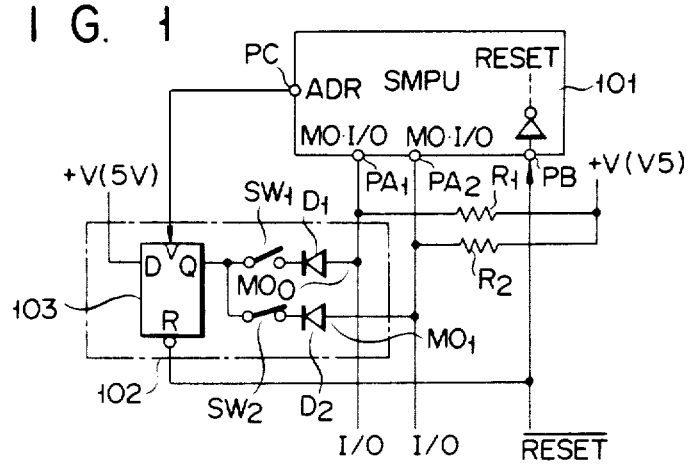
F I G. 2
(a) RESET (PB)
(b) ADR (PC)
(c) 103 (Q)
(d) MO·I/O (PA1, PA2)
(e) MODE
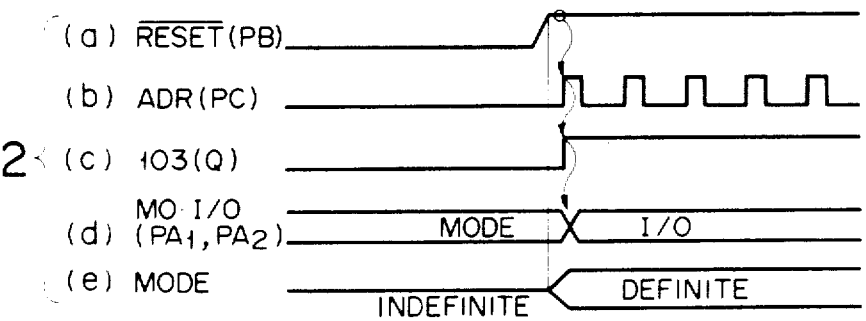
F I G. 3
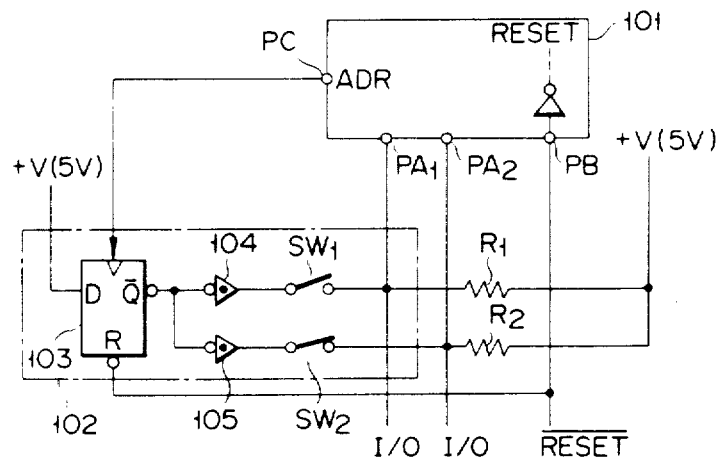

MODE SETTING CONTROL SYSTEM

BACKGROUND OF THE INVENTION

This invention relates to a mode setting control system for a one-chip microprocessor to which a mode setting circuit is connected.

In recent years, semiconductor technology has advanced very much. Through these technical advances a so-called one-chip microprocessor was developed which comprises a microprocessing unit (MPU), a random access memory (RAM), a read only memory (ROM) and the like—all formed on a single chip. The one-chip microprocessor is set to one of several various operation modes so that the user may inspect the RAM, the ROM and the like, expand the external memory or an input-output (I/O) device, or supply either bus data or I/O port data to the connection terminals. To set the one-chip microprocessor to one operation mode, the following mode setting systems are selectively used:

(1) A system in which mode data generated by operating mode designating switches, provided outside the one-chip microprocessor, is selectively fed through mode input pins assigned to the various operation modes, respectively.

(2) A system in which a specific voltage (e.g. 12 V), other than the TTL level voltage (i.e. 5 V), is applied to one or more of the pins through which data may enter to be processed, thus supplying a selected mode data.

(3) A system in which selected mode data from mode designating switches is fed via pins, through which data may enter to be processed, when a reset signal reaches a threshold voltage utterly different from the TTL threshold voltage. And the threshold voltage of the mode input pins (e.g. $V_{IL}$ 2.2 V, $V_{IH}$ 4.0 V) is also different from that of TTL.

The above-mentioned systems (1)–(3) have inherent deficiencies however. System (1) requires many pins, and its cost is inevitably high. Further, since the pins are not used very efficiently, the one-chip microprocessor cannot fully function. System (2) needs a special power source (e.g. a 12 V power source) for setting the one-chip microprocessor to any operation mode desired, and furthermore data to be processed cannot be fed to the one-chip microprocessor as long as the specific voltage (e.g. 12 V) is applied to one or more of the pins to supply mode data. System (3) is disadvantageous in that the mode data entered is unreliable. The unreliability occurs because a mode signal is written when a reset signal reaches a specific threshold level (e.g. 1.4 V) and therefore, the mode data may be fed at the incorrect time if the reset signal contains much noise.

In short, each of the conventional mode setting systems contains at least one inherent deficiency.

SUMMARY OF THE INVENTION

It is an object of the invention to provide a mode setting system for a one-chip microprocessor to which a mode setting circuit is connected, which efficiently uses the connecting pins of the microprocessor.

It is another object of the invention to provide a mode setting system for a one-chip microprocessor to which a mode setting circuit is connected which is simple in structure.

It is still another object of the invention to provide a mode setting system for a one-chip microprocessor to which a mode setting circuit is connected which provides stable mode setting.

According to the invention, a mode setting control system is provided for a one-chip microprocessor having a mode setting circuit connected thereto and which has selected mode data fed to it from the mode setting circuit through the same pins which are also used for entering data to be processed. After the one-chip microprocessor has been brought out of the reset state, the system disables the mode setting circuit using a timing signal delivered from a specific pin of the microprocessor, regardless of the mode in which the microprocessor is set. As a result, the one-chip microprocessor is set to a data input-output mode other than the mode data-feeding mode.

BRIEF DESCRIPTION OF THE DRAWINGS

FIG. 1 is a block diagram of a mode setting control system, according to the present invention;

FIGS. 2(a) to 2(e) are timing charts illustrating how the system, of FIG. 1 operates; and FIG. 3 is a block diagram of another embodiment of a mode setting control system according to the present invention.

DETAILED DESCRIPTION OF THE PREFERRED EMBODIMENTS

The basic technical idea of the invention will be briefly stated. Whenever a one-chip microprocessor (hereinafter called "SMPU") is reset, mode data ($MO_0$, $MO_1$) designated by a mode setting circuit is supplied to the SMPU. In other words, whenever a signal $\overline{RESET}$ reaches a logic level "1", the mode data ($MO_0$, $MO_1$) is fed to the SMPU. The mode setting circuit is then disabled or disconnected from the SMPU by a signal which is supplied through a specific pin of the SMPU after the mode setting circuit designates the mode data. The disabling signal is a timing signal called an "address strobe (AS) signal" or an "address latch enable (ALE) signal". (In the description of the embodiments that follows, the signal will be called an "ADR signal".) Hence the pins through which the mode data has been fed to the one-chip microprocessor are prepared to enter data to be processed. (In the embodiments described later, the pins function as I/O pins.) The timing signal has the same voltage and the same threshold level as any of the other signals used in the mode setting control system according to the invention. In addition, the period within which the mode data may be supplied to the SMPU is sufficiently long. The SMPU can therefore be easily set to a desired mode with the proper time period and its pins can be used more efficiently.

FIG. 1 is a block diagram of a mode setting control system according to the present invention. FIGS. 2(a) to 2(e) are timing charts illustrating when the various signals are supplied in the system shown in FIG. 1.

As shown in FIG. 1, an SMPU 101 has pins $PA_1$ and $PA_2$ for receiving mode data and I/O port data arranged in such a manner as shown in FIG. 2(d). The SMPU 101 has a reset signal pin PB for receiving such a reset signal $\overline{RESET}$ as shown in FIG. 2(a) and an ADR signal output pin PC for supplying such an ADR signal as shown in FIG. 2(b). Further provided is a mode setting circuit 102. The mode setting circuit 102 comprises mode designating switches $SW_1$ and $SW_2$, a diode $D_1$ connected between the pin $PA_1$ and the switch $SW_1$, a diode $D_2$ connected between the pin $PA_2$ and the switch $SW_2$ and a D flip-flop 103. The D flip-flop 103 disables the mode data designated by operating the switches $SW_1$ and $SW_2$, after it has been brought out of the reset state. The D flip-flop 103 has its clock input terminal connected to the pin PC of the SMPU 101. Its reset input terminal R is connected to receive a reset signal $\overline{RESET}$ which is generated externally. Its set output terminal Q is switched from low level "0" to high level "1" in synchronism with the rising of the ADR signal after the D flip-flop 103 has been brought out of the reset state, as shown in FIG. 2(c). When the set output terminal Q of the D flip-flop 103 is switched to high level "1" and the D flip-flop 103 is thus set, a circuit, comprised of the diodes $D_1$ and $D_2$ and the switches $SW_1$ and $SW_2$, is electrically disconnected from the pins $PA_1$ and $PA_2$. The pull-up resistors $R_1$ and $R_2$ are connected respectively to the pins $PA_1$ and $PA_2$ respectively.

It will now be described how the system shown in FIG. 1 operates. As long as the reset signal $\overline{RESET}$ has a low level and the SMPU 101 therefore remains in the reset state, the D flip-flop 103 of the mode setting circuit 102 is reset. That is, the set output terminal Q of the D flip-flop 103 is held at low level "0" as shown in FIG. 2(c). In this condition, the circuit, comprised of the diodes $D_1$ and $D_2$ and the mode designating switches $SW_1$ and $SW_2$, is electrically connected to the SMPU 101. Thus, 2-bit mode data ($MO_0$, $MO_1$) representing the ON-OFF states of the switches $SW_1$ and $SW_2$ is supplied to the SMPU 101, one bit through the pin $PA_1$ and the other bit through the pin $PA_2$. The pins $PA_1$ and $PA_2$ are therefore used to set the SMPU 101 to a desired operation mode. When the reset signal $\overline{RESET}$ changes to a high level, the SMPU 101 is brought out of the reset state. Then, upon lapse of a predetermined time, such an ADR signal as shown in FIG. 2(b) is supplied from the pin PC of the SMPU 101 to the clock input terminal of the D flip-flop 103. During the period between the rising of the reset signal $\overline{RESET}$ and the supply of the ADR signal, the mode data ($MO_0$, $MO_1$) is written into the SMPU 101 through the pins $PA_1$ and $PA_2$. That is, the mode data ($MO_0$, $MO_1$) is latched by a mode register (not shown) provided in the SMPU 101, at such timing as illustrated in FIG. 2(e). As shown in FIG. 2(c), the D flip-flop 103 comes into the set state when the ADR signal supplied to the clock input terminal rises to a high level. As a result, the circuit, comprised of the diodes $D_1$ and $D_2$ and the mode designating switches $SW_1$ and $SW_2$, is electrically disconnected from the SMPU 101. Hence, I/O port data may be written into the SMPU 101 through the pins $PA_1$ and $PA_2$ as shown in FIG. 2(d).

Since the mode setting control system of FIG. 1 works in the above-mentioned manner, mode data can be written into the SMPU 101, using only one voltage (e.g. TTL level voltage of 5 V) and only one threshold voltage. Further, since the period during which mode data may be written is sufficiently long, the mode data is easily written at the proper time and the mode data thus written is very reliable. Moreover, since an ADR signal is used in switching the D flip-flop 103 to disable the mode setting circuit 102 and since the pins $PA_1$ and $PA_2$ can be used for entering not only mode data but also I/O port data, more effective use of the pins is possible.

In the above-described embodiment the I/O port data input pins $PA_1$ and $PA_2$ are used for writing mode data as well. Instead, other pins such as address pins, data pins, an interruption pin, bus control pins and clock pins could be used.

Now another embodiment of the invention will be described with reference to FIG. 3. In FIG. 3, like or identical numerals and symbols are used to designate like or identical elements as those used in the embodiment shown in FIG. 1.

As shown in FIG. 3, the clock input terminal of a D flip-flop 103 is connected to receive such an ADR signal as shown in FIG. 2(b) from the pin PC of the SMPU 101. The reset input terminal R of the D flip-flop 103 is connected to receive such a reset signal $\overline{RESET}$ as shown in FIG. 2(a). The reset output terminal $\overline{Q}$ of the D flip-flop 103 is switched from high level "1" to low level "0" in synchronism with the rising of the ADR signal after the D flip-flop 103 is brought out of the reset state. Once the D flip-flop 103 is switched to low level "0", a circuit, comprised of open-collector output inverters 104 and 105 and mode designating switches $SW_1$ and $SW_2$, is electrically disconnected from the SMPU 101, more precisely from pins $PA_1$ and $PA_2$ of the SMPU 101.

It will now be described how the system shown in FIG. 3 operates. As long as the reset signal $\overline{RESET}$ shown in FIG. 2(a) has a low level and the SMPU 101 thus remains in the reset state, the D flip-flop 103, an element of a mode setting circuit 102, is reset. That is, the reset output terminal $\overline{Q}$ of the D flip-flop 103 is held at high level "1". In this condition, the circuit, comprised of the open-collector output inverters 104 and 105 and the mode designating switches $SW_1$ and $SW_2$, is electrically connected to the SMPU 101. Thus, 2-bit mode data ($MO_0$, $MO_1$), representing the ON-OFF states of the switches $SW_1$ and $SW_2$, is supplied to the SMPU 101; one bit to the pin $PA_1$ and the other bit to the pin $PA_2$. The pins $PA_1$ and $PA_2$ are therefore used to set the SMPU 101 to a desired operation mode. When the reset signal $\overline{RESET}$ changes to a high level as shown in FIG. 2(a), the SMPU 101 and the D flip-flop 103 are brought out of the reset state. Then, upon lapse of a predetermined time, an ADR signal such as shown in FIG. 2(b) is supplied from the pin PC of the SMPU 101 to the clock input terminal of the D flip-flop 103. During the period between the rising of the reset signal $\overline{RESET}$ and the supply of the ADR signal, the mode data ($MO_0$, $MO_1$) is written into the SMPU 101 through the pins $PA_1$ and $PA_2$. That is, the mode data ($MO_0$, $MO_1$) is latched by a mode register (not shown) provided in the SMPU 101, at such timing as illustrated in FIG. 2(e). The D flip-flop 103 changes to the set state when the ADR signal supplied to the clock input terminal rises to a high level. As a result, the circuit, comprised of the open-collector output inverters 104 and 105 and the mode designating switches $SW_1$ and $SW_2$, is electrically disconnected from the SMPU 101. Hence, the SMPU 101 may write into or read from the I/O port data through the pins $PA_1$ and $PA_2$ as shown in FIG. 2(d).

What is claimed is:

1. A mode setting control system for mode data and other data, comprising:
    processing means including a plurality of pins for processing data;
    mode setting means electrically connected to at least one of said pins for writing mode data and other data into said processing means; and
    control means electrically connected to at least one of said pins to which said mode setting means is not connected and to said mode setting means and said processing means, for controlling said processing means and said mode setting means to permit the pins to which said mode setting means is connected to receive data other than mode data.

2. A mode setting control system, according to claim 1, wherein said processing means is a one-chip microprocessor.

3. A mode setting control system, according to claim 1, wherein said control means includes a reset signal generator means which generates a reset signal, and said processing means includes timing signal generator means which generates a timing signal and is electrically connected to said mode setting means.

4. A mode setting control system, according to claim 3, wherein said mode setting means writes mode data to said processing means during a period between a reset signal from said reset signal generator means and a timing signal from said processing means.

5. A mode setting control system, according to claim 4, wherein said mode setting means includes a flip-flop, at least one switch connected to an output of said flip-flop for designating an operation mode and at least one diode, the number of diodes corresponding to that of the switches and each diode being connected to a switch, said flip-flop being reset by said reset signal and set by said timing signal.

6. A mode setting control system, according to claim 5, wherein said flip-flop is a D flip-flop having its Q output connected to said at least one switch.

7. A mode setting control system, according to claim 5, wherein said mode setting means includes inverter means electrically connected between said switch and said output of said flip-flop.

8. A mode setting control system, according to claim 7, wherein said flip-flop is a D flip-flop and said inverter means is at least one open-collector type inverter connected to the Q output terminal of said D flip-flop.

9. A mode setting circuit for mode data which is connected to a reset signal generator for generating a reset signal and to a predetermined number of pins of a microprocessor, wherein the microprocessor generates a timing signal and wherein at least one of said predetermined number of pins being a timing signal pin which writes mode data into said microprocessor at predetermined times to enable each pin which receives mode data at particular times to receive data other than mode data at different times, comprising:

first circuit means connected to said timing signal pin and said reset signal generator and which generates a control signal in response to said timing signal and said reset signal; and second circuit means electrically connected to said first circuit means and which generates mode data in response to said first circuit means.

10. A mode setting circuit, according to claim 9, wherein said first circuit means is a flip-flop having a clock input for receiving said timing signal, a reset signal input for receiving said reset signal and an output, said flip-flop being reset by said reset signal and set by said timing signal.

11. A mode setting circuit, according to claim 10, wherein said second circuit means includes at least one switch connected to said output of said flip-flop and at least one diode, the number of diodes corresponding to that of the switches and each diode being connected to a switch.

12. A mode setting circuit, according to claim 11, wherein said second circuit means includes at least one inverter connected to said output of said flip-flop and at least one switch, the number of switches corresponding to that of the inverters and each switch being connected to an inverter.

13. A mode setting circuit, according to claim 11 or 12, wherein said second circuit means is active when said flip-flop is reset and said microprocessor is reset.

* * * * *